United States Patent [19]

Gerling et al.

[11] Patent Number: 4,714,811

[45] Date of Patent: Dec. 22, 1987

[54] MICROWAVE OVEN AND METHOD WITH CONTROLLED HEATING PROFILE

[75] Inventors: John E. Gerling, Modesto, Calif.; Ji T. Ren, Chengdu, China

[73] Assignee: Jova Enterprises, Inc., Modesto, Calif.

[21] Appl. No.: 888,024

[22] Filed: Jul. 18, 1986

[51] Int. Cl.⁴ .............................................. H05B 6/74
[52] U.S. Cl. ...................... 219/10.55 F; 219/10.55 B; 219/10.55 M
[58] Field of Search ................. 219/10.55 F, 10.55 E, 219/10.55 B, 10.55 A, 10.55 R, 10.55 M

[56] References Cited

U.S. PATENT DOCUMENTS

| | | | |
|---|---|---|---|
| 3,316,380 | 4/1967 | Pansing | 219/10.55 F |
| 3,541,289 | 11/1970 | Smith | 219/10.55 A |
| 4,308,445 | 12/1981 | Offutt | 219/10.55 F |
| 4,424,431 | 7/1984 | Gurubatham | 219/10.55 F |
| 4,430,539 | 2/1984 | Suzuki | 219/10.55 F |
| 4,459,449 | 7/1984 | Hirata | 219/10.55 B |
| 4,463,239 | 7/1984 | Miller | 219/10.55 F |

Primary Examiner—Philip H. Leung
Attorney, Agent, or Firm—Flehr, Hohbach, Test, Albritton & Herbert

[57] ABSTRACT

Microwave oven and method in which the microwave energy pattern and the load are moved relative to each other, and the rate of movement is varied to control the amount of heating in different portions of the load. In some embodiments, a rotator causes the microwave energy pattern to be modulated within the oven cavity. The microwave power at different points in the oven cavity is measured with the rotator in different angular positions, and the angular velocity of the rotator is varied so that the rotator spends more time in angular positions where more heating is required. In other embodiments, the load is rotated, and the angular velocity of the load is varied so that the load spends more time in angular positions where additional heating is required.

20 Claims, 3 Drawing Figures

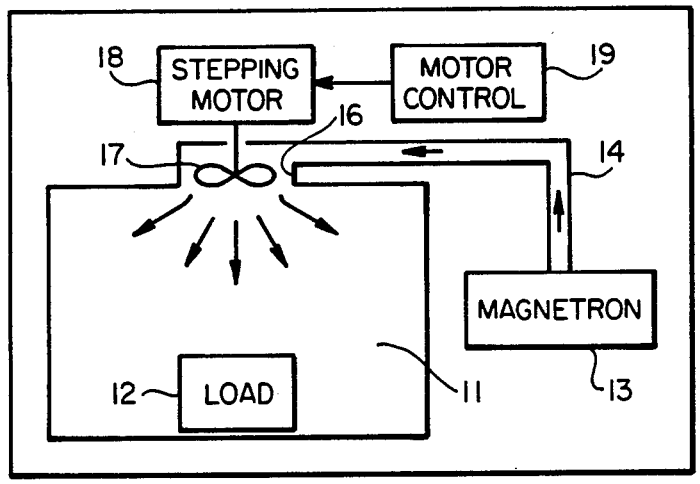
FIG_1
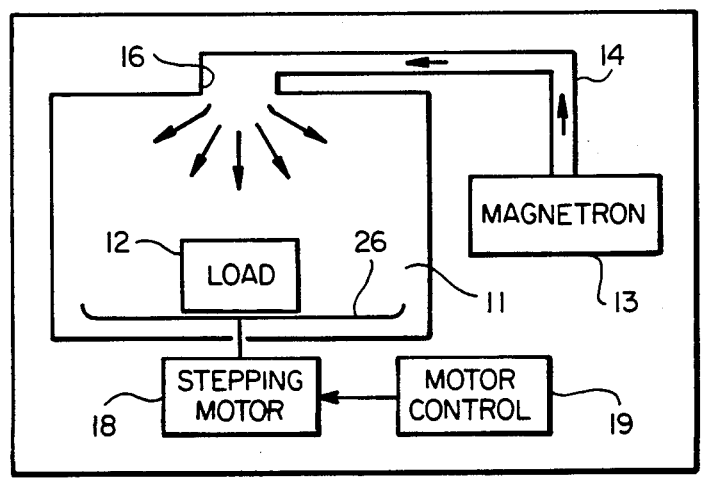
FIG_3

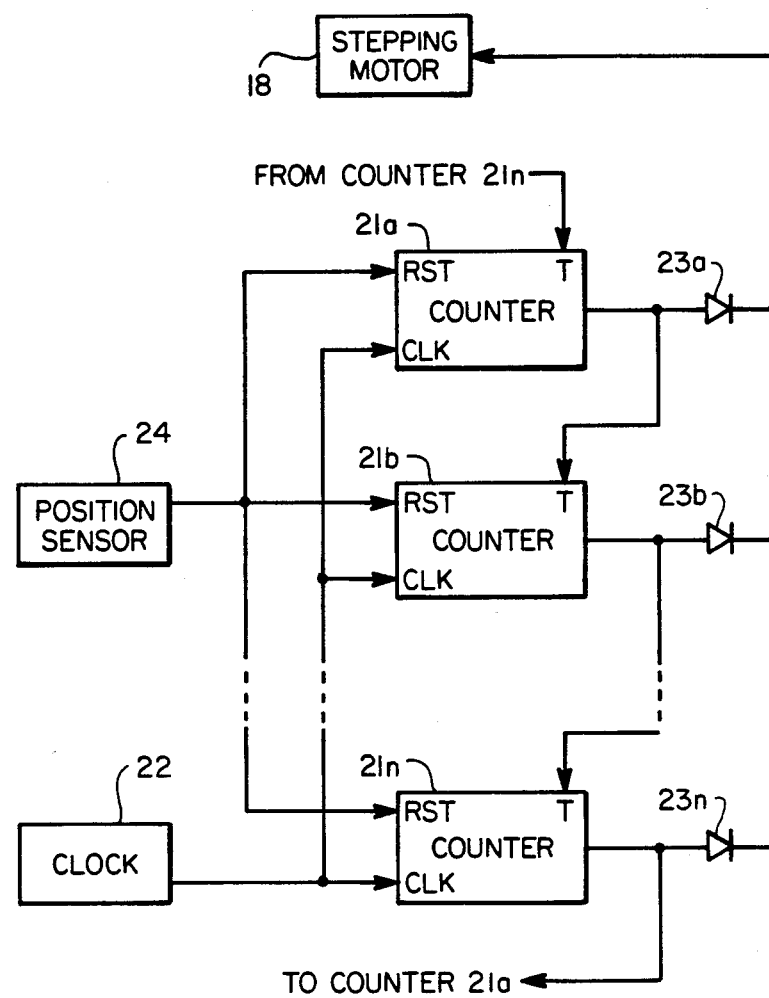
FIG_2

MICROWAVE OVEN AND METHOD WITH CONTROLLED HEATING PROFILE

This invention pertains generally to microwave ovens, and more particularly to a microwave oven and method in which the heating profile is controlled.

At the present time, microwave ovens employ rotation in order to improve heating uniformity. In some ovens, a turntable rotates the food product or load through the mode patterns of the microwave power in the oven cavity. These patterns are produced by the system which introduces the microwave energy into the cavity. Some ovens have a mode stirrer or other rotating device which causes the mode patterns to be repositioned and/or altered within the oven cavity, and a few ovens employ both a turntable and a mode stirrer or other device for shifting the microwave energy pattern.

Although there have been some recent improvements, particularly in the devices which rotate to change the mode pattern, non-uniform heating is still a major problem in domestic microwave ovens. This non-uniformity results from the fact that different areas of the oven receive different amounts of power over a period of time even when rotation of the load and/or microwave energy is employed.

It is in general an object of the invention to provide a new and improved microwave oven and method which provide more uniform heating than microwave ovens heretofore provided.

Another object of the invention is to provide a microwave oven and method of the above character in which the heating profile is controlled to provide substantially uniform heating of a load.

These and other objects are achieved in accordance with the invention by providing a microwave oven and method in which the microwave energy and the load are moved relative to each other, and the rate of movement is varied to control the amount of heating in different portions of the load. In some embodiments, a rotator causes the microwave energy pattern to shift within the oven cavity. The microwave power at different points in the oven cavity is measured with the rotator in different angular positions, and the angular velocity of the rotator is varied so that the rotator spends more time in angular positions where more heating is required. In other embodiments, the load is rotated, and the angular velocity of the load is varied so that the load spends more time in angular positions where additional heating is required.

FIG. 1 is a simplified schematic illustration of one embodiment of a microwave oven incorporating the invention.

FIG. 2 is a simplified block diagram of one embodiment of a control system for use in the embodiment of FIG. 1.

FIG. 3 is a simplified schematic illustration of another embodiment of a microwave oven incorporating the invention.

As illustrated in FIG. 1, the microwave oven has a cavity 11 in which a load 12 is heated. Microwave energy generated by a magnetron 13 is introduced into the oven cavity through a waveguide 14 and an inlet port 16.

A mode stirrer 17 is positioned in the inlet port at the top of the oven cavity for stirring the mode patterns of the microwave energy in the cavity to effect relative movement between the energy and the load. The mode stirrer is driven by a stepping motor 18 controlled by a motor control 19. The stepping motor rotates the stirrer in discrete steps. The heating rate is controlled by controlling the length of time the stirrer remains in each successive angular position or step. The heating profile within the cavity is dependent upon the manner in which the stirrer rotates, and by proper selection of the time the stirrer remains in each of its angular positions, substantially uniform heating of the load can be achieved. In one presently preferred embodiment, the stepping motor makes 20 steps per revolution, and the mode stirrer makes one revolution in approximately 2–3 seconds.

As illustrated in FIG. 2, motor control 19 comprises a plurality of presetable counters 21a–21n, with one such counter being provided for each step of the stepping motor. With a stepping motor which makes 20 steps per revolution, for example, 20 counters are employed. Clock pulses are supplied to the counters by a clock 22. The outputs of the counters are connected to the stepping motor by isolation diodes 23a–23n. The output of each counter is also connected to a trigger input of the next counter, with the output of counter 21n being connected back to the trigger input of counter 21a. As each successive counter reaches its preset count, it delivers an output pulse to the stepping motor, and it triggers the next counter to begin its count. Thus, the counters function as a series of delay circuits, delivering a series of output pulses at time intervals corresponding to the preset counts programmed into the counters.

Means is provided for synchronizing the operation of the counters with the position of the mode stirrer so that each of the counters corresponds to a specific position of the stirrer. This means includes a position sensor 24 connected to the RESET inputs of the counters to reset or initialize the counters when the mode stirrer is in a predetermined position.

Operation and use of the embodiments of FIGS. 1 and 2, and therein the method of the invention, are as follows. Counters 21a–21n are programmed to provide the desired heating profile (e.g., uniform) in the oven cavity by successively positioning mode stirrer 17 at each of its angular positions and measuring the microwave power level at different positions in the oven cavity with the stirrer in each of its positions. The counters are then programmed in accordance with the data obtained by these measurements to provide the desired heating profile. For uniform heating, the counters are programmed to provide greater time delays between successive stepping pulses when the mode stirrer is at angles which cause regions in the cavity to receive less than the average power in the cavity and to provide shorter time delays between successive pulses when the stirrer is at angles which cause overheating. By controlling the amount of time the stirrer remains in the individual positions, it is possible to compensate for the variations in the mode patterns created by the manner in which the microwave energy is introduced and to provide substantially uniform heating throughout the oven cavity. The programming generally needs to be done only once, at the time the oven is manufactured. In production, like ovens tend to have similar mode patterns, and the measurements and determination of the proper time delays only need to be done once for each model of oven. Once the time delays have been determined, all ovens of a given model can be programmed in a similar manner.

Once the control circuit has been programmed, the oven is used like conventional microwave ovens. The food product or other load to be heated is positioned in the oven cavity, and the magnetron is turned on for the time required to heat the load. The person using the oven does not need to do any programming of the control circuit, and he may not even be aware of this circuit except for the substantially improved uniformity of heating which the oven provides.

When the oven is first turned on, the operation of the counters may be out of synchronization with the position of the mode stirrer, depending upon where the mode stirrer has previously come to rest. As the mode stirrer reaches the reference position, however, the counters are reset, and synchronization is established. Thus, the lack of synchronization will not last for more than one revolution of the mode stirrer. The resetting of the counters also serves to restore synchronization upon each revolution of the mode stirrer in case it should somehow be disturbed during the operation of the oven.

Rotation of the microwave energy in the oven cavity can also be effected by other means such as introducing the energy into the oven cavity with an antenna which rotates and is controlled in a manner similar to mode stirrer 17. Other types of programmable control circuits can be employed for generating the pulses for driving the stepping motor in the desired manner. Such circuits include other types of delay circuits and a computer chip programmed to deliver the proper sequence of pulses.

FIG. 3 illustrates an embodiment in which relative movement between the microwave energy and the load is achieved by movement of the load. This oven is generally similar to the oven illustrated in FIG. 1, and like reference numerals designate corresponding elements in the two embodiments. In the embodiment of FIG. 3, the load 12 rests upon a turntable 26 which rotates about a vertically extending axis. The turntable is driven by a stepping motor 18, and the rotation of the turntable is varied in a controlled manner by motor control 19 to provide the desired heating pattern in the load.

Operation and use of the embodiment of FIG. 3 are similar to that described above. In this embodiment, however, the sensors which measure the microwave power for programming purposes are mounted on the turntable, and the measurements are taken with the turntable in its different angular positions. As in the embodiment of FIG. 1, uniform heating is achieved by programming the motor control so that the turntable spends more time in angles where underheating occurs and less time at angles where overheating occurs.

If desired, the programming of the motor control circuit can be made available to the user of the oven so that he can program it to suit his own particular needs. In the embodiments disclosed, for example, a keypad or a set of manually operable switches, such as DIP switches, would enable the user to program the counters or computer to provide the time delays he desires. In this manner, the oven could be customized for a given food product which might or might not require uniform heating.

Different food products may require different heating patterns, and food manufacturers could package data for such patterns with their food products. The data could, for example, be provided in machine readable form on a small card which could be inserted into a reader on the oven to automatically program the oven for the proper heating profile for the particular product.

In ovens which have preprogrammed cooking times and power levels for different food products, the time delays for different food products could be stored and selected along with the cooking times and power levels to automatically provide the proper heating profile for a particular food product.

The invention has a number of important features and advantages. It permits the heating profile of a microwave oven to be accurately controlled, and it provides substantially more uniform heating than microwave ovens with devices which rotate at a constant angular velocity. Once programmed, the oven is easy to use, and it does not require any special skill or training on the part of the user.

It is apparent from the foregoing that a new and improved microwave oven and method with controlled heating profile have been provided. While only certain presently preferred embodiments have been described in detail, as will be apparent to those familiar with the art, certain changes and modifications can be made without departing from the scope of the invention as defined by the following claims.

We claim:

1. In a microwave oven: a cavity for receiving a load to be heated, means for introducing microwave energy into the cavity to heat the load, a rotator for effecting relative rotation between the load and the mode patterns of the microwave energy within the oven cavity, a stepping motor connected to the rotator for moving the rotator in discrete steps between a plurality of angular positions, and preprogrammable means for applying a series of control signals of individually programmed timing to the stepping motor to control the amount of time the rotator remains in each of its angular positions and thereby provide a predetermined pattern of heating in the load.

2. The microwave oven of claim 1 wherein the rotator comprise a mode stirrer which causes the mode patterns to be charged within the oven cavity.

3. The microwave oven of claim 1 wherein the rotator comprises an antenna which introduces the microwave energy into the oven cavity.

4. The microwave oven of claim 1 wherein the rotator comprises a turntable on which the load is placed.

5. The microwave oven of claim 1 including means for determining when the rotator is in a predetermined angular position, and means for resetting the preprogrammable means to synchronize the control signals with the position of the rotator.

6. In apparatus for heating a load with microwave energy: means for applying microwave energy to the load, means including a stepping motor movable in discrete steps between a plurality of positions for effecting relative movement between the load and the microwave energy, programmable means for applying a series of control signals of individually programmed timing to the stepping motor to control the amount of time the stepping motor spends in each of its positions, and means responsive to the position of the stepping motor for resetting the programmable means to synchronize the control signals with the position of the stepping motor.

7. The apparatus of claim 6 wherein the means for applying microwave energy to the load comprises a microwave oven having a cavity in which the load is held.

8. The apparatus of claim 6 wherein the means for effecting relative movement comprises a mode stirrer which causes the mode patterns of the microwave energy to change relative to the load.

9. The apparatus of claim 6 wherein the means for effecting relative movement comprises a rotating antenna which radiates the microwave energy toward the load.

10. The apparatus of claim 6 wherein the means for effecting relative movement comprises a turntable on which the load is placed.

11. In a method of heating a load in the cavity of a microwave oven having a rotator for effecting relative rotation of the microwave energy and the load, the steps of: introducing microwave energy into the oven cavity, measuring the microwave energy at different points in the oven cavity with the rotator in different angular positions, programming a control to provide a series of control signals of individually programmed timing corresponding to the amount of microwave energy measured when the rotator is in the different angular positions, and moving the rotator between the different angular positions in response to the control signals to provide a predetermined pattern of heating in the load.

12. The method of claim 11 wherein the rotator causes the microwave energy patterns to change within the oven cavity.

13. The method of claim 11 wherein the rotator causes the load to rotate within the oven cavity.

14. The method of claim 11 including the steps of determining when the rotator is in a predetermined angular position, and resetting the control to synchronize the control signals with the position of the rotator.

15. The method of claim 11 wherein the rotator is turned in discrete steps.

16. In a method of heating a load with microwave energy with means for effecting relative movement between the energy and the load, the steps of: introducing microwave energy into a region where the load is to be heated, measuring the microwave energy at different points in the region with the means for effecting relative movement in different positions, programming a control to provide a series of control signals of individually programmed timing corresponding to the amount of microwave energy measured when the means for effecting relative movement is in different positions, and moving said means between the different positions in response to the control signals to provide a predetermined pattern of heating in the load.

17. The method of claim 16 wherein the microwave energy pattern is modulated to effect the relative movement between the energy and the load.

18. The method of claim 16 wherein the load is rotated to effect the relative movement between the microwave energy pattern and the load.

19. The method of claim 16 including the steps of determining when the means for effecting relative movement is in a predetermined position, and resetting the control to synchronize the control signals with the position of the means for effecting relative movement when said means is in the predetermined position.

20. The method of claim 16 wherein the relative movement between the microwave energy and the load is effected in discrete steps.

* * * * *